United States Patent [19]
Larson

[11] Patent Number: 5,368,341
[45] Date of Patent: Nov. 29, 1994

[54] PRE-CONDITIONED AIR HOSE ASSEMBLY FOR AIRCRAFT

[76] Inventor: L. Robert Larson, 312 Herricks Rd., Mineola, N.Y. 11501

[21] Appl. No.: 968,362

[22] Filed: Oct. 29, 1992

[51] Int. Cl.⁵ .................................................. F16L 31/00
[52] U.S. Cl. ...................................... 285/260; 285/328; 138/119; 454/76
[58] Field of Search .............. 285/260, 328; 24/306, 24/242; 454/903, 76; 2/908-919; 138/119, DIG. 4, 128

[56] References Cited

U.S. PATENT DOCUMENTS

| | | | |
|---|---|---|---|
| 936,566 | 10/1909 | Rosendahl | 285/260 X |
| 1,971,595 | 8/1934 | Booth | 138/128 |
| 2,197,914 | 4/1940 | Bagley | 285/260 |
| 2,232,517 | 2/1941 | Evans | 285/260 X |
| 2,521,174 | 9/1950 | Krupp | 285/260 X |
| 2,595,408 | 5/1952 | Quest | 285/260 X |
| 3,128,476 | 4/1964 | Lash | 285/260 X |
| 3,532,372 | 10/1970 | Stroud | 285/260 X |
| 3,705,736 | 12/1972 | Dawson | 285/260 |
| 3,818,948 | 6/1974 | Hedger | 138/119 |
| 3,941,159 | 3/1976 | Toll | 24/442 X |
| 3,951,153 | 4/1976 | Leucci | 285/260 X |
| 4,271,566 | 6/1981 | Perina | 24/442 |
| 4,478,661 | 10/1984 | Lewis | 138/119 X |
| 4,556,167 | 12/1985 | Fox et al. | 24/442 |
| 4,632,019 | 12/1986 | Whiteman | 454/76 |
| 4,680,838 | 7/1987 | Astl | 24/442 |
| 4,979,613 | 12/1990 | McLaughlin et al. | 24/442 X |

FOREIGN PATENT DOCUMENTS

| | | | |
|---|---|---|---|
| 471926 | 8/1975 | Australia | 285/260 |
| 1460556 | 12/1966 | France | 285/260 |

Primary Examiner—Dave W. Arola
Attorney, Agent, or Firm—Galgano & Burke

[57] ABSTRACT

Pre-conditioned air hoses for aircraft are provided which consists of a plurality of hose segments and a plurality of hook and loop fasteners closure connections interconnecting the hose segments. When the hose segments are assembled, pre-conditioned air can be carried from a ventilating system to the aircraft on the ground before the aircraft is operational and ready for takeoff.

5 Claims, 1 Drawing Sheet

PRE-CONDITIONED AIR HOSE ASSEMBLY FOR AIRCRAFT

The present invention relates generally to interconnectable, insulated, flexible ventilation hoses, tubes or ducts. More specifically, it relates to pre-conditioned air hoses for aircraft.

During the time an aircraft is at a terminal awaiting boarding of passengers, and while the engines are off, pre-conditioned air is blown into the aircraft from a ground based heating or air conditioning system. This is done through the use of insulated flexible hoses or tubes, commonly called "preconditioned air hoses or tubes," which connect the heating or air conditioning unit with the internal ventilation system of the aircraft.

These hoses have been manufactured with various laminated materials and in varying lengths to accommodate different types of aircraft. Laminated materials are prone to weathering and peeling. These hoses are linked together through zipper connections; and depending on the type, size and location of the aircraft being serviced, it is necessary to add or delete hose sections to establish a suitable and appropriate connection of the aircraft's ventilation system with the ground based unit. The zippers are cumbersome to connect and disconnect on the terminal ramp, especially in the cold weather when the handlers are wearing gloves. In addition, the zippers often break when the hoses are run over by ramp equipment. Weaknesses are inherent in these hoses due to a rubber bumper spiraled along the surface to protect the material from scrapes and tears, but tears do result along this bumper. There is no proper way of repairing these hoses in the field, so they must be replaced. Makeshift repairs can be made with duct tape or in some similar way, but this is not satisfactory, and the repair is limited to the outer lining of a multi-ply hose.

This has been a long standing problem in the airline industry. The airline industry has sought, over the past twenty years, some easier and less costly way of making connections, but to date, no one has come up with a solution.

SUMMARY OF THE INVENTION

Accordingly, it is an object of the present invention to provide pre-conditioned air hoses for aircraft that will overcome the shortcomings of the prior art devices.

Another object of the present invention is to provide pre-conditioned air hoses for aircraft in which hose segments can be connected together and disconnected in a facile and quick manner which eliminates the need for zippers.

An additional object of the present invention is to provide pre-conditioned air hoses for aircraft in which the hose segments are relatively simple in construction and can be economically manufactured, and which are also fire retardant, highly resistant to oil and acid, and completely waterproof.

A further object is to provide pre-conditioned air hoses for aircraft that are simple, relatively light and easy to use.

Still a further object is to provide pre-conditioned air hoses for aircraft that are economical in cost to manufacture.

Certain of the foregoing and related objects are readily attended in a pre-conditioned air hose for interconnecting a ground-based heating/ventilating unit with the internal ventilation system of an aircraft, comprising a plurality of pre-conditioned air hoses having ends interconnected with the ends of adjacent hoses; and a plurality of hook and loop fasteners coupled to the ends of the hoses for interconnecting the ends of adjacent hoses.

Most advantageously, the hook and loop fasteners comprises two portions, a hook portion joined to one end of each hose, and a loop portion joined to an opposite end of the hose.

Preferably, each hose has a first end and a second end, the latter of which has a pair of opposed slits so as to define a first flap and a second flap, the latter of which has a pair of extension tabs joined thereto. The first end of the hose has an externally-disposed band of one of the portions of the hook and loop fasteners fixed thereon, and the first and second flaps of the second end each have an internally-disposed strip of the other portion of the hook and loop fasteners fixed thereon.

In a particularly preferred embodiment of the invention, the extension tabs of the second flaps also have an internally-disposed strip of the other portion of the hook and loop fastener fixed thereon, and the first flap has opposite lateral end portions and a pair of externally-mounted tabs of the one portion of the hook and loop fastener fixed on the opposite lateral end portions thereof which may be overlapped by the extension tabs of the second flaps.

Most desirably, the band comprises the hook portion and the strips comprises the loop portion of the hook and loop fasteners. It is especially desirable that the hoses are provided with a pair of protective edge bindings, each attached along opposite longitudinal sides of each hose segment, so as to provide the hose segments with a generally oval cross-section.

Certain of the foregoing and related objects are also attained in a pre-conditioned air hose for inter-connecting a ground-based heating/ventilating unit with the internal ventilation system of an aircraft, including a plurality of pre-conditioned air hoses having ends interconnectable with the ends of adjacent hoses; fastening means coupled to the ends of the hoses for interconnecting the ends of adjacent hoses; and a pair of protective edge bindings, each attached along opposite longitudinal sides of each tube segment, so as to provide the tube segments with a generally oval cross-section.

BRIEF DESCRIPTION OF THE DRAWING FIGURES

Other objects and features of the present invention will become apparent from the following detailed description considered in connection with the accompanying drawings which disclose one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 1:
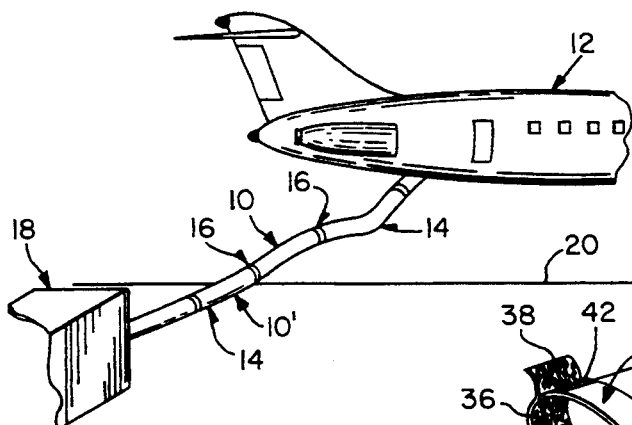
FIG. 1 is a perspective view showing the air hoses of the instant invention in use.

Turning now in detail to the drawing and, in particular, FIG. 1 thereof, therein illustrated are pre-conditioned air hoses or tubes generally designated 10 embodying the present invention for aircraft 12 which consists of a plurality of hose or tube segments 14, the ends of which are serially joined together by conventional hook and loop fastener or closure connections 16 (such as that sold under the trademark VELCRO ®), as discussed in greater detail hereinafter. When the hose segments 14 are assembled, pre-conditioned air can be carried from a ventilating system 18 to the internal ventilation system of the aircraft 12 on the ground 20, before the aircraft 12 is ready for takeoff.

Figure 2:
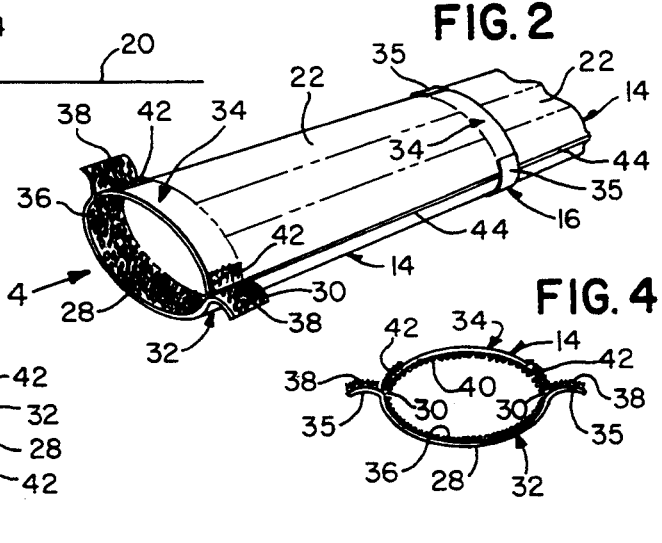
FIG. 2 is a fragmentarily-illustrated perspective view of two air hoses connected together.
Figure 3:
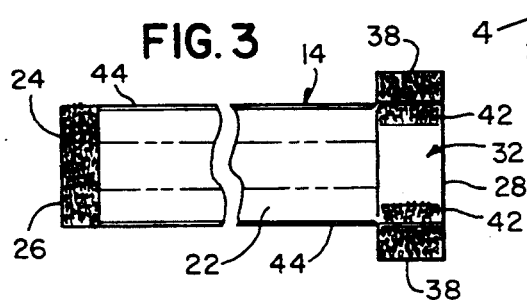
FIG. 3 is a fragmentarily-illustrated top view of one of the hose segments.
Figure 4:
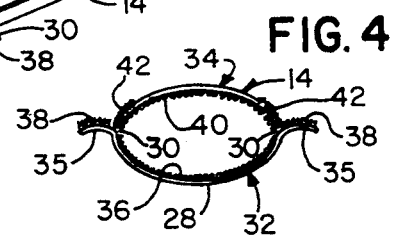
FIG. 4 is an end view of the hose taken in the direction of arrow 4 in FIG. 2.

Each hose segment 14 is preferably manufactured out of vinyl coated nylon 22 (see FIG. 2), which affords extraordinary strength and flexibility in all types of weather conditions and temperatures. As seen in FIG. 3, each VELCRO ® closure connection 16 includes band 24 of a first portion of VELCRO ® fasteners (e.g., the hook portion) located externally at a first end 26 of one hose segment 14. A second end 28 of the hose segment 14 has a pair of opposite-disposed slits 30 (displaced 180°), so as to form a pair of flaps generally designated 32 and 34, the former of which is provided with a pair of extension tabs 35 (see FIGS. 2 and 4). A first strip 36 of a second portion (e.g., the loop portion) of the VELCRO ® fasteners is located internally on the first flap 32 and tabs 35, so that the ends 38 of the first strip 36 can overlap the external edges of the first flap 34. A second strip 40 of the second portion (loop portion) of the VELCRO ® fastener is located internally on the second flap 34. A pair of tabs 42 of the first portion (hook portion) of the VELCRO ® fasteners are located externally on the ends of second flap 34 to permit mechanical interlocking thereof with ends 38 of strip 36.

Figure 5:
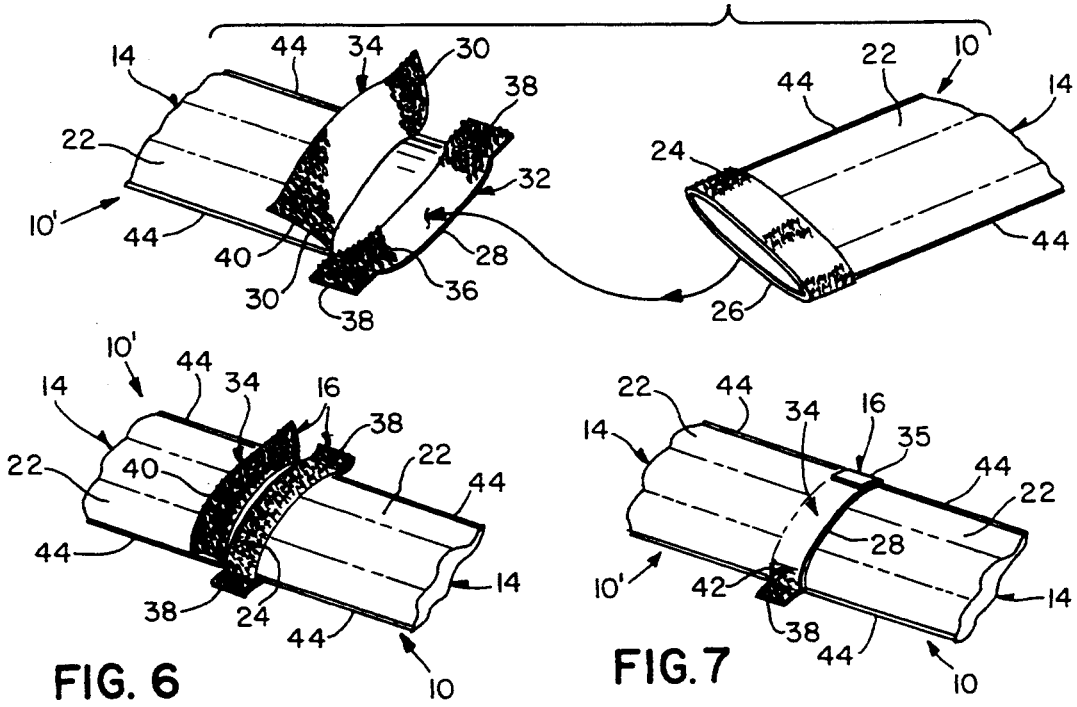
FIG. 5 is an exploded perspective view showing two hose segments ready to be connected together.
Figure 6:
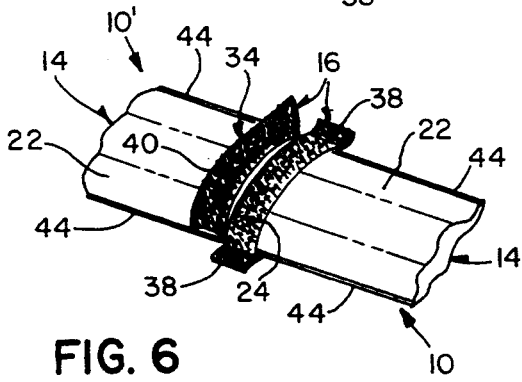
FIG. 6 is a perspective view showing the first stage of connection between the two hose segments.
Figure 7:
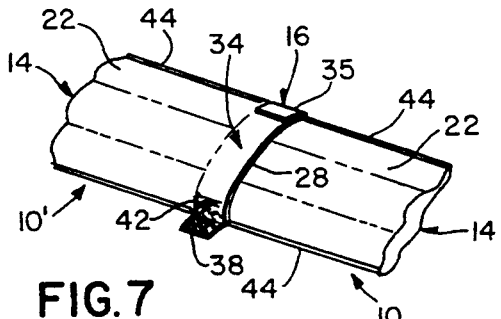
FIG. 7 is a perspective view showing the second stage of connection between the two hose segments.

As shown in the sequential connection steps illustrated in FIGS. 5-7, in order to connect two air hoses 10, 10' together, the bottom portion of band 24 on the end 26 of one hose 10 is directed toward (see FIG. 5) and firmly placed against the first strip 36 on the first flap 32 of the second hose 10' (FIG. 6). Then the second strip 40 on the second flap 34 of hose 10' will be pressed down over the top portion of band 24 (FIG. 7). The tabs 35 and ends 38 of the first strip 36 of hose 10' will then be folded over against the tabs 42 to form the VELCRO ® closure connection 16. The band 24 and strips 36, 40 of the VELCRO ® closure connection 16 is made of sufficient width (typically 5-6") and strength (heavy duty VELCRO ® fasteners) to provide enough strength to withstand the normal high pressures associated with the pre-conditioned air and manual handling during installation.

A pair of stitched-on protective edge bindings made of a woven, tear resistant cloth and/or synthetic resin material 44 are each attached along opposite longitudinal sides of each hose segment 14, for additional strength and for ease of storage. As seen best in FIG. 4, the bindings 44 give the hoses an oval or football-like cross-sectional shape which serves as a handy guide for folding and rolling the hose segments 14 for storage. These provide significant advantages over the spirally-extending bindings used for cylindrical tubes which afford no assistance in this regard and which, in fact, hamper easy alignment thereof. The oppositely-disposed parallel edge bindings of the present invention allow for neat and quick folding and/or roll-up of the tubes.

Various modification can be made to the present invention as will be apparent to those skilled in the art. For example, although the pre-conditioned air hoses are preferably manufactured of vinyl coated nylon, which is easily repaired with patch kits while in use, other materials and multi-ply constructions can be used to suit the particular application. While the VELCRO ® closure connections which afford simple zipperless connections for the hose segments and provide enough strength to withstand the high pressures of pre-conditioned air, other zipperless hook and loop fasteners or mechanical interlocking systems of similar locking and unlocking properties could also be used.

Accordingly, while only one embodiment of the present invention have been shown and described, it is to be understood that many changes and modifications may be made thereunto without departing from the spirit and scope of the invention as disclosed herein.

What is claimed is:

1. A pre-conditioned air hose for interconnecting a ground-based heating-ventilating unit with the internal ventilation system of an aircraft, comprising:
   a) a plurality of pre-conditioned air hoses having ends interconnectable with the ends of adjacent hoses in an overlapping manner; and
   b) a plurality of hook and loop tape fasteners coupled to said ends of said hoses for interconnecting the ends of adjacent hoses, said hook and loop tape fasteners including two portions, a hook tape portion joined to one end of each hose, and a loop tape portion joined to an opposite end of said hose;
   c) wherein each hose has a first end and a second end, the latter of which has a pair of opposed slits so as to define a second hose end having a first flap and a second flap, and wherein said first end of said hose has an externally-disposed tape band of one of said portions of said hook and loop fasteners fixed thereon, and wherein said first and second flaps of said second end each has an internally-disposed tape of the other portion of said hook and loop fasteners fixed thereon.

2. A pre-conditioned air hose for interconnecting a ground-based heating-ventilating unit with the internal ventilation system of an aircraft, comprising:
   a) a plurality of pre-conditioned air hoses having ends interconnectable with the ends of adjacent hoses in an overlapping manner; and
   b) a plurality of hook and loop tape fasteners coupled to said ends of said hoses for interconnecting the ends of adjacent hoses, said hook and loop tape fasteners including two portions, a hook tape portion joined to one end of each hose, and a loop tape portion joined to an opposite end of said hose;
   c) wherein each hose has a first end and a second end, the latter of which has a pair of opposed slits so as to define a second hose end having a first flap and a second flap, the latter of which has a pair of extension tabs joined thereto, and wherein said first end of said hose has an externally-disposed tape band of one of said portions of said hook and loop fasteners fixed thereon, and wherein said first and second flaps of said second end each has an internally-disposed tape of the other portion of said hook and loop fasteners fixed thereon.

3. The assembly of claim 2, wherein said extension tabs of said second flap also have an internally-disposed strip of the other portion of said hook and loop fastener fixed thereon and wherein said first flap has opposite lateral end portions and has a pair of externally-mounted tabs of said one portion of said hook and loop fastener fixed on said opposite lateral end portions thereof which may be overlapped by said extension tabs of said second flaps.

4. The assembly of claim 3, wherein said band comprises the hook portion and said strips comprises the loop portion of said hook and loop fasteners.

5. The assembly of claim 4, further including a pair of protective edge bindings, each attached along opposite longitudinal sides of each hose segment.

* * * * *